(12) United States Patent
Anderson et al.

(10) Patent No.: US 10,735,033 B2
(45) Date of Patent: Aug. 4, 2020

(54) MODULAR RF FRONT-END FOR ACCESS POINTS AND RADIO HEADS

(71) Applicant: Cisco Technology, Inc., San Jose, CA (US)

(72) Inventors: Fred J. Anderson, Lakeville, OH (US); Paul J. Stager, Akron, OH (US); John M. Blosco, Norton, OH (US); Qing Zhao, Fremont, CA (US); David Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/171,503

(22) Filed: Oct. 26, 2018

(65) Prior Publication Data
US 2020/0136657 A1   Apr. 30, 2020

(51) Int. Cl.
*H04B 1/00* (2006.01)
*H04B 1/10* (2006.01)

(52) U.S. Cl.
CPC ........... *H04B 1/0028* (2013.01); *H04B 1/006* (2013.01); *H04B 1/0096* (2013.01); *H04B 1/1027* (2013.01); *H04B 2001/1063* (2013.01)

(58) Field of Classification Search
CPC ........... H01Q 1/3275; H01Q 3/24; H04B 1/40
USPC ....................................................... 375/350
See application file for complete search history.

(56) References Cited

U.S. PATENT DOCUMENTS

| | | | |
|---|---|---|---|
| 9,794,791 B2 | 10/2017 | Hasarchi et al. | |
| 9,998,167 B2 | 7/2018 | Nick et al. | |
| 2010/0273426 A1* | 10/2010 | Walley | H04W 52/265 455/63.1 |
| 2014/0370824 A1* | 12/2014 | Larsen | H04B 7/12 455/77 |
| 2016/0119796 A1* | 4/2016 | Ho | H01Q 21/29 370/328 |

OTHER PUBLICATIONS

Chunna Zhang, PhD diss., University of Tennessee, "Reconfigurable RF Front End Components for Multi-Radio Platform Application", http://trace.tennessee.edu/utk_graddiss/88, Aug. 2009, 141 pages.
Infineon Technologies AG, "RF front-end solutions for mobile applications", www.infineon.com/rf, Jun. 2016, 20 pages.

(Continued)

*Primary Examiner* — Leila Malek
(74) *Attorney, Agent, or Firm* — Edell, Shapiro & Finnan, LLC (57) ABSTRACT

A wireless communication device is built from a base module and a plurality of front-end modules. Each of the plurality of front-end modules is configured to operate a different one of a plurality of radio frequency services and having a front-end module connector configured to removeably mate with a base module connector of the base module. A particular front-end module is connected to the base module. Upon connection of the particular front-end module to the base module connector, the base module reads information from a memory of the particular front-end module to determine the radio service that the particular front-end module is configured to operate and to supply the control signals to configure and control front-end circuitry of the front-end module to operate the radio service.

20 Claims, 7 Drawing Sheets

(56) References Cited

OTHER PUBLICATIONS

Resonant Inc., "RF Innovation and the Transition to 5G Wireless Technology", https://www.resonant.com/resources/white-papers, Oct. 20, 2016, 22 pages.
4G Americas, "Wireless Handset RF Front-End Optimization", Oct. 2014, 28 pages.
Ben Thomas et al., White Paper, "RF Architecture Choices for Next-Generation Handset Designs", www.qorvo.com, Jul. 2016, 6 pages.

* cited by examiner

MODULAR RF FRONT-END FOR ACCESS POINTS AND RADIO HEADS

TECHNICAL FIELD

The present disclosure relates to wireless communication devices.

BACKGROUND

Remote radio heads and small cell access points (APs) for 4G and 5G as well as Wi-Fi™ systems typically are built with many frequency band-specific and mode-specific models or SKUs based on a particular licensed frequency band or bands. A preponderance of base platform SKUs is expensive and cumbersome for manufacturing, distribution, and sales channels. It is not feasible, especially when functioning in paired spectrum (Frequency Division Duplex (FDD) mode), to create a wideband, universal radio frequency (RF) front-end due to the need for specific preselection and diplexer filtering, and varying transmitter requirements.

DESCRIPTION OF EXAMPLE EMBODIMENTS

Overview

In one embodiment, a communication device is provided comprising base module and a plurality of front-end modules. Each of the plurality of front-end modules is configured to operate a different one of a plurality of radio frequency services. Each front-end module includes one or more antennas, front-end circuitry, a memory configured to store information indicating which one of the plurality of radio frequency services the front-end module is configured to operate, and a front-end module connector coupled to the front-end circuitry and to the memory.

The base module includes a modem configured to perform baseband modulation of transmit data to generate baseband modulated transmit data and baseband demodulation of received baseband modulated data to recover receive data, and one or more radio transceivers coupled to the modem and configured to upconvert the baseband modulated transmit data to produce radio frequency (RF) transmit signals for transmission and to downconvert RF received signals to obtain the received baseband modulated data. The one or more transceivers have universal frequency band coverage spanning frequency bands of operation of the plurality of front-end modules. The base module further includes a base module connector configured to mate with the front-end module connector of any one of the plurality of front-end modules, the connector configured to supply the RF transmit signals to, and to receive the RF received signals from, a particular front-end module of the plurality of front-end modules that is connected to the base module connector, the base module connector further configured to supply power and control signals from the base module to said particular front-end module. The base module further includes a processor configured to communicate via the base module connector with said particular front-end module that is connected to the base module connector, wherein upon connection of said particular front-end module to the base module connector, the processor is configured to read the information from the memory of said particular front-end module to determine the radio service that the particular front-end module is configured to operate, to download any manufacturing calibration parameters (if necessary), and to supply the control signals to configure and control the front-end circuitry to operate the radio service.

EXAMPLE EMBODIMENTS

There is an emerging market need for combination Wi-Fi®/5G combination access points (APs). For example, a multiprotocol baseband Application Specific Integrated Circuit (ASIC) may be used to perform Layer 1 (L1) and Layer 2 (L2) functions in both Wi-Fi and 5G. This allows for the creation of multi-personality APs which has the benefit of "future proofing" the customer in an anticipated Wi-Fi to 5G transition. However, the exact 5G use case, modes, and frequency bands are diverse and not practical to cover with a single SKU. That is, whereas radio frequency (RF) transceivers may cover a wide RF frequency range, RF front end components (such amplifiers and filters) are not easily configured for broadband operation while retaining efficiency, and often fixed bandpass filters are needed for rejecting out-of-band (undesired) signals in both receive and transmit modes.

Again, this creates a desire for modular RF front-ends that make APs factory- or field-adaptable.

Technology and spectrum availability advances are creating opportunities (and challenges) in offering customers flexibility to cover expanding modes and use cases, as well as future proofing their base platform investments. Advances in software-defined radio/multiprotocol baseband systems are becoming affordable so as to enable high-volume, low cost implementation in an AP. AP platforms can open up access to multiple slices of spectrum in which to operate various radio services. Other advances include configurable wideband integrated RF transceivers and analog front-ends that allow direct RF to baseband conversion.

Figure 1:
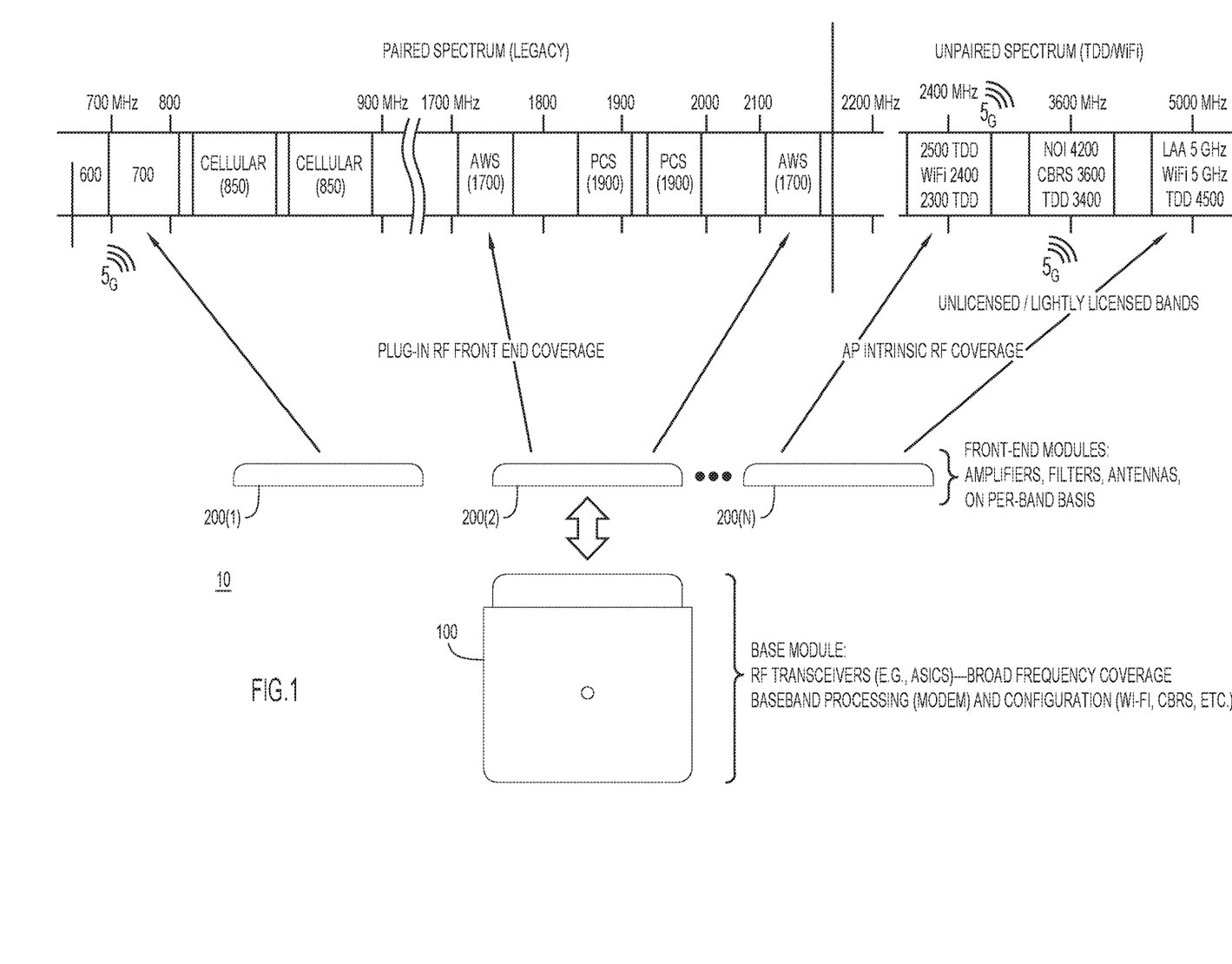
FIG. 1 is a diagram illustrating a wireless communication device including a base module and a plurality of removeably mating front-end modules, according to an example embodiment.

Reference is now made to FIG. 1. FIG. 1 shows a modular communication device 10 that includes a base module 100 and a plurality of front-end architecture modules 200(1)-200(N) that can plug-fit into the base module 100. The base module 100 may include the baseband and RF transceiver functionality of an AP or remote radio head (RRH). The RF transceiver functionality of the base module 100 has universal (wideband) frequency band coverage spanning (all) frequency bands of operation of the plurality of front-end modules 200(1)-200(N). The front-end modules 200(1)-200(N) can change the RF personality of the base module 100 (and thus the personality of the resulting communication device 10) without special tools, testing, or post-mating calibration. The front-end modules 200(1)-200(N) are enabled by an economical blind-mate RF analog/digital connector system and are fully calibrated transmit (TX) amplifier, receive (RX) amplifier filter and antenna systems.

Thus, the front-end modules 200(1)-200(N) modularize the radio service personality in a self-contained way so that when a particular front-end module is connected to the base module 100, there is no or minimal antenna path calibration or testing and thus no or minimal system level operational expense in assembling a resulting communication device 10.

Each front-end module 200(1)-200(N) may snap-in/snap-fit to the base module 100 or the front-end modules may be may "tethered" by a cable harness consisting of RF and digital cables when remotely-mounted antennas are desired, as will become more apparent from the description below.

For example, as shown in FIG. 1, when front-end module 200(1) is mated to base module 100, the resulting communication device 10 can serve a particular band of the spectrum, when front-end module 200(2) is mated to base module 100, the resulting communication device can serve another particular band or bands of the spectrum, and likewise front-end module 200(N) is mated to base module 100, the resulting communication device 10 can serve yet another band or bands of the spectrum. Thus, the pluggable front-end modules allows for offloading to different modules, rather than to different integrated devices, the RF cost and complexity for a particular frequency band of coverage. This allows for accommodating different wireless service provider carrier requirements in the field by installing/mating the appropriate front-end module (of modules 200(1)-200(N)) to the base module 100.

Using the modular concept depicted in FIG. 1, APs can now be manufactured in conventional (integrated) fashion for fixed or universal capabilities, or with flexible front-end modules for covering a variety of bands at the discretion or preference of the customer. As will become apparent from the description below, the front-end modules 200(1)-200(N) can come in several variations, and the customer need not purchase them at the time the base unit is purchased.

Figure 2A:
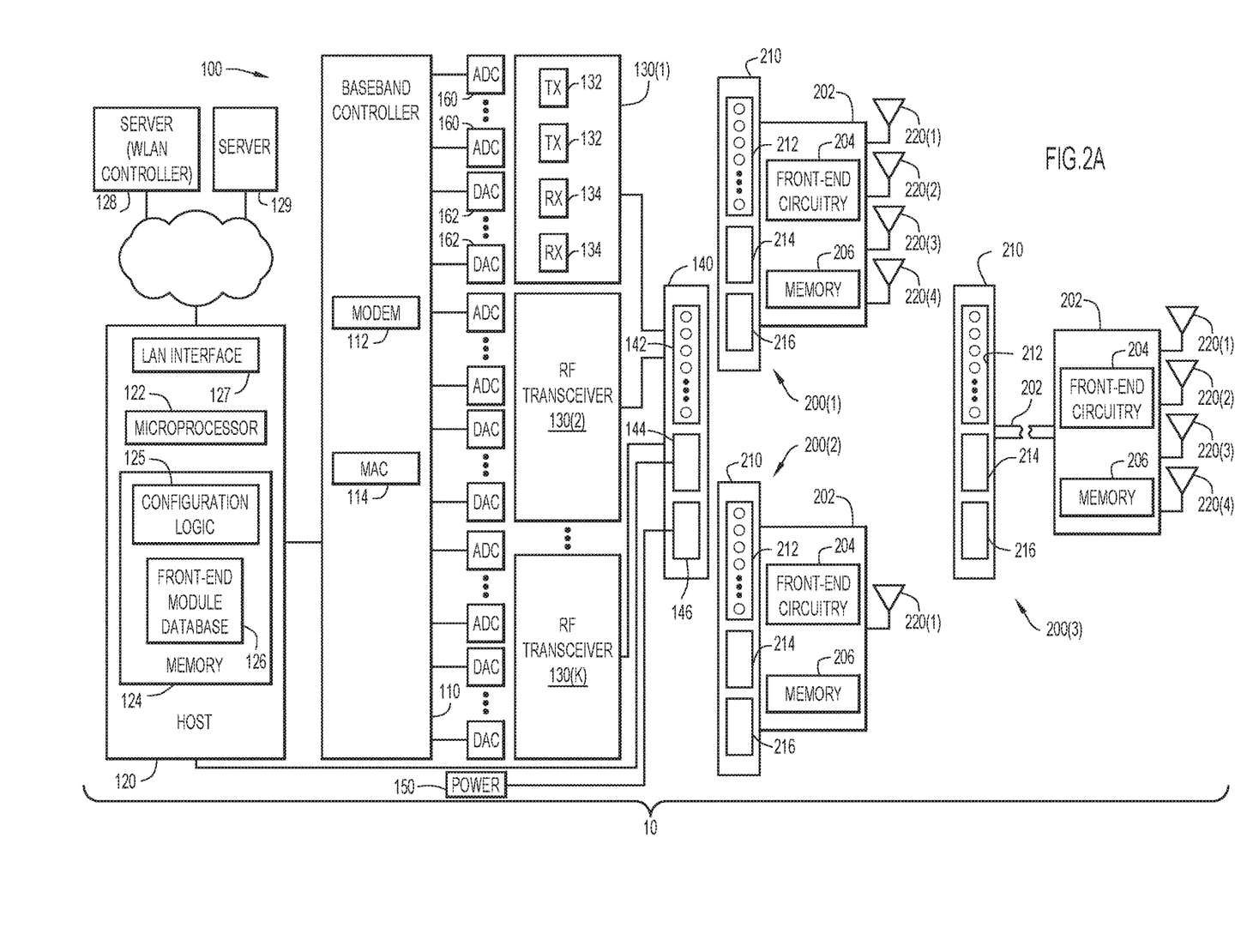
FIG. 2A is a more detailed block diagram of the base module and the plurality of front-end modules, according to an example embodiment.
Figure 3:
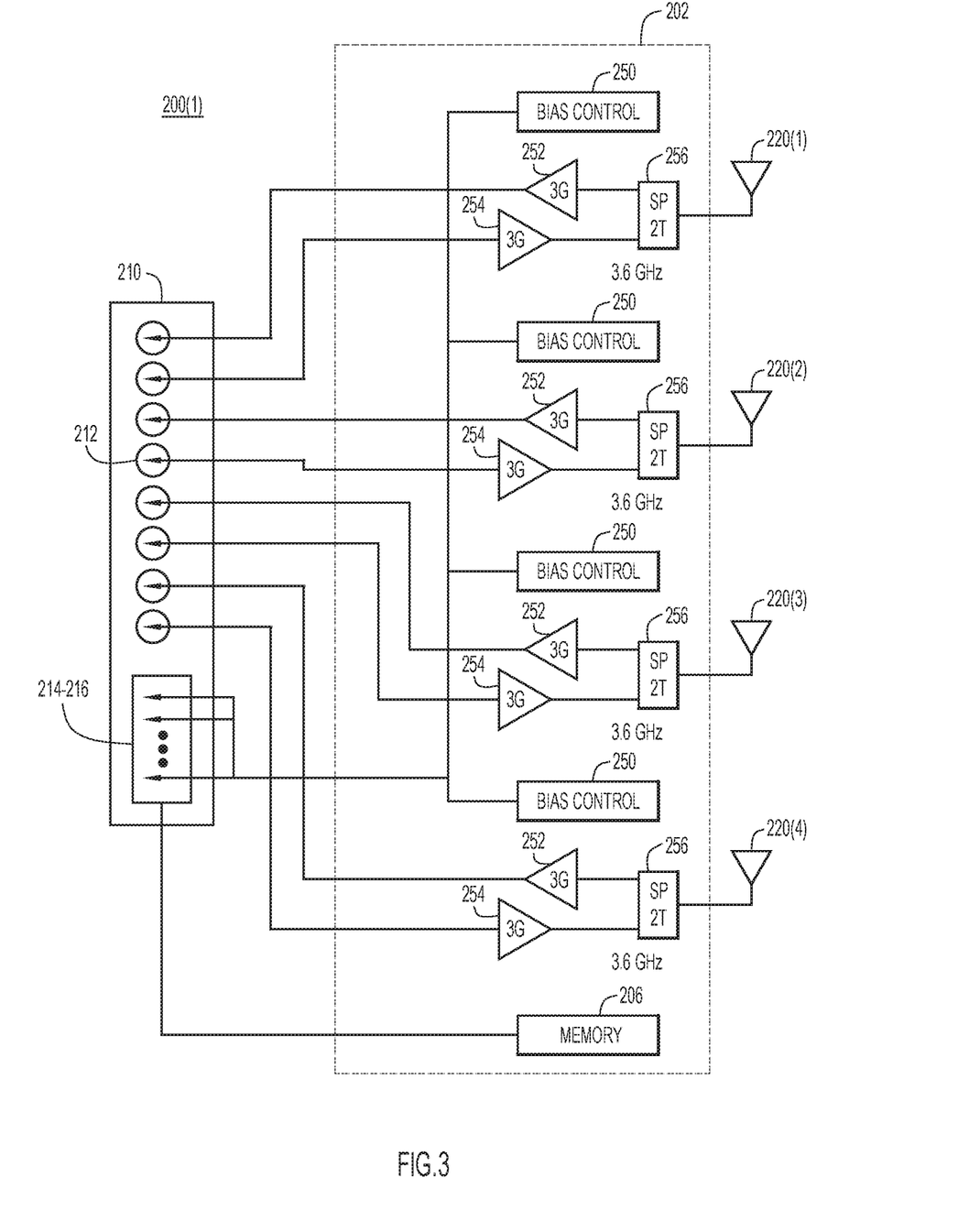
FIGS. 3-5 are detailed block diagrams of different types of front-end modules, according to an example embodiment.
Figure 4:
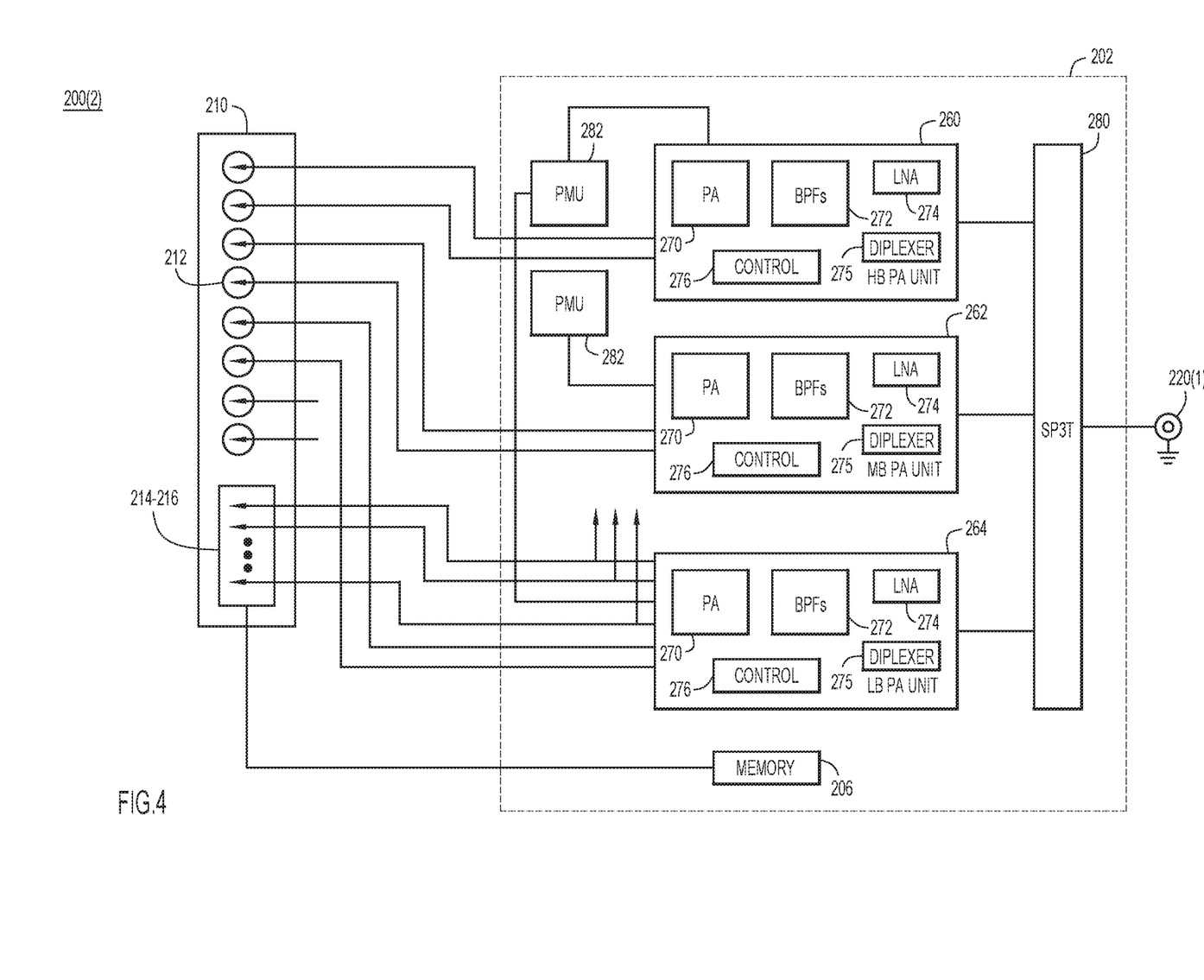
Figure 5:
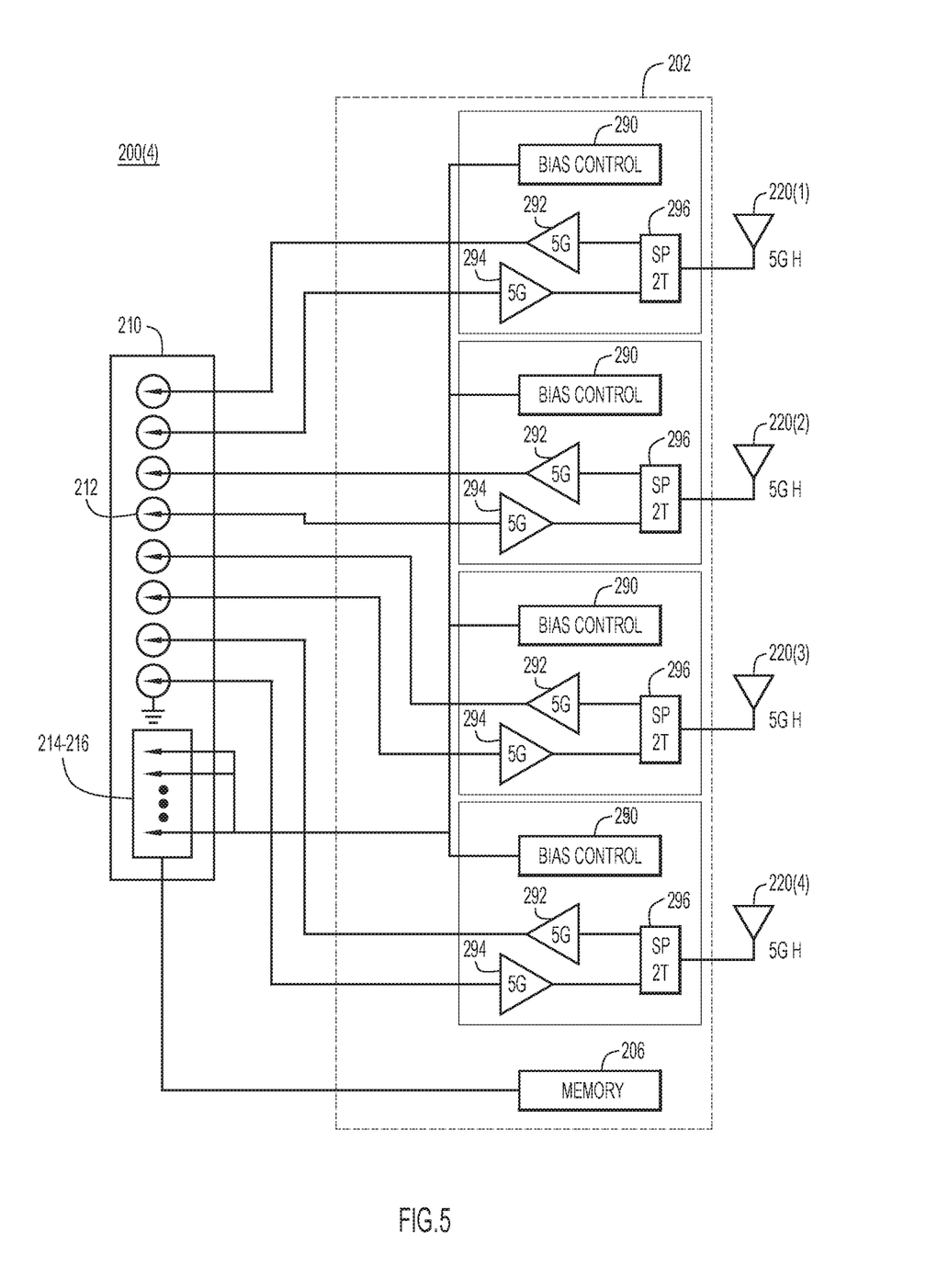

Reference is now made to FIG. 2A. FIG. 2A illustrates the base module 100 in more detail, along with examples of three different types of front-end modules 200(1), 200(2) and 200(3), in accordance with one embodiment. It is to be understood that the front-end modules 200(1), 200(2) and 200(3) are dedicated to different frequency bands/radio services, but for simplicity in FIG. 2, they are shown in generically in block diagram form. FIGS. 3-5, described below, illustrate example embodiments of different front-end modules at a more detailed level.

The base module 100 includes a baseband controller 110 that may be built on a single integrated circuit System-on-Chip (SoC) or several integrated circuits. The baseband controller 110 includes a modem 112 that performs the baseband modulation and demodulation operations and a media access control (MAC) processor 114 that performs media access control functions for one or more communication standards/protocols.

The baseband controller 110 interfaces with a host unit 120 that includes a microprocessor 122 that serves as an overall controller for the base module 100, a memory 124 that stores instructions for configuration logic 125 and a front-end module database 126. The host unit 120 also includes a local area network (LAN) interface 127 to enable network connectivity with other entities, such as a server 128. The configuration logic 125 includes instructions (software) that, when executed by the microprocessor 122, cause the microprocessor 122 to perform configuration operations depending on the particular front-end module that is connected to the base module 100, as described below. The front-end module database 126 stores identification information of the plurality of front-end module types with which the base module 100 is configured to operate. In one variation, the front-end module database 126 may reside at the server 128. The server 128 may serve as a controller for a wireless local area network (WLAN) in which an AP (the communication device 10) operates. The server 128 may also store, or obtain from a server 129 managed by a manufacturer of the base module 100 and front-end modules 200(1)-200(N), manufacturing calibration parameters that the base module 100 may download to use for configuring a particular front-end module that connects to the base module 100.

The base module 100 further includes one or more RF transceivers 130(1)-130(K). Each RF transceiver may include one or more TXs (upconverters) 132 and one or more receivers RXs (downconverters) 134. As appreciated by one with ordinary skill in the art, each TX 132 may include a local oscillator and one or more mixers to upconvert a baseband modulated signal to a particular frequency, and similarly each RX 134 may include a local oscillator and one or mixers to downconvert a received RF signal from a particular frequency to baseband. The TXs 132 and RXs 134 may use zero-intermediate frequency (zero-IF) or IF-based architectures. Each of the RF transceivers 130(1)-130(N) may be embodied in an ASIC. The RF transceivers 130(1)-130(N), either individually or collectively, have universal (wideband) frequency coverage, spanning the frequency bands of the various front-end modules that are configured to operate with the base module 100.

The base module 100 further includes a base module connector 140 that includes analog RF connection pins 142, a block 144 of digital (control) connection pins and a block 146 of power connection pins 216. The RF connection pins 142 are connected to the RF transceivers 130(1)-130(K), the digital (control) pins are connected to the baseband controller 110 and the power pins are connected to the power supply 150.

Between the baseband controller 110 and the RF transceivers 130(1)-130(K) are blocks of analog-digital-converters (ADCs) 160 and blocks of digital-to-analog converters (DACs) 162. The ADCs 160 convert analog baseband receive signals output by the RF transceivers 130(1)-130(K) to digital baseband signals that are then processed by the modem 112. The DACs 162 convert digital analog baseband transmit signals output by the modem 112 to analog baseband transmit signals that are then supplied as input to the RF transceivers 130(1)-130(K) for upconversion/transmission.

In some embodiments, the base module 100 may include internal antennas, as shown at 170 and 172 in FIG. 2A.

Front-end modules 200(1) and 200(2) are examples of modules that include internal or locally-connected antennas. The front-end modules 200(1) and 200(2) include a housing 202 that contains front-end circuitry 204 that may be embodied on one more integrated circuits that include RX and TX amplifiers, filters and TX/RX switches. There is also a memory 206 that is configured to store information indicating which of a plurality of radio frequency services (in one or more frequency bands) the particular front-end module is configured to operate. In one example, the memory 206 is an Electrically Erasable Programmable Read Only Memory (EEPROM). Each front-end module further includes a front-end module connector 210 that includes analog RF connection pins 212, a block 214 of digital (control) connection pins and a block 214 of power connection pins 216. In the example shown in FIG. 2A, front-end module 200(1) includes four antennas 220(1)-220(4), whereas front-end module 200(2) includes one antennas 220(1). The front-end module connector 210 mates with the base module connector 140.

Front-end module 200(1) may have information stored in its memory 206 indicating that it is configured to serve a first radio service (first one or more frequency bands of operation) and front-end module 200(2) may have information stored in its memory 206 indicating that it is configured to serve a second radio service (second one or more frequency bands of operation), different from the first radio service.

Front-end module 200(3) is an example of a front-end module in which the subassembly/housing 202 containing the front-end circuitry 204 is separate from the connector 210 by a cable tether 215, thus enabling antennas of the front-end module 200(3) to be more remote from the base module 100 when the front-end module 200(3) is connected to the base module 100. The antennas 220(1)-220(4) of front-end module 200(3) may be external antennas attached to the housing 202 or conformal antennas internal to or on the exterior the housing 202. The cable tether 215 includes one or more coaxial cables and wires for the analog signals as well as the digital/control signals and power.

It is also envisioned that a front-end module may be equipped with active antenna arrays to enable analog beam forming, as well as multi-element arrays with integrated power amplifiers, full dimension multiple-input multiple-output (MIMO) capability, etc.

Again, the front-end modules may include internal/conformal antennas or provide connections to external antennas. In still another variation, the base module 100 may have internal antennas and a front-end module may have external antennas, for special use cases.

In one embodiment, the connector 140 of the base module 100 and the connector 210 of the front-end modules may be mating connectors, manufactured and sold by Amphenol under the brand DART™. The connectors 140 and 210, when mated together, provide a high performance multi-connection system that combines a multiplicity of high frequency RF connections with a versatile digital/analog/power interconnect. This connection system may be embodied in board-to-board and board-to-cable variants.

The RF transceivers 130(1)-130(K) of the base module 100 are either broadband or capable of band-switching to accommodate front-ends modules dedicated for specific bands/applications. Such radio transceivers may be custom built integrated circuits, or may be off the shelf integrated circuits that are currently available. The RF transceivers 130(1)-130(K) offer appropriate external interfaces, and frequency coverage or sub-banding for the front-end modules.

Finally, in the case of front-end modules spanning different radio bands and services, modem 112 of the baseband controller 110 performs multi-protocol software defined baseband modulation and demodulation and other various physical layer functions required.

The multi-antenna interface of the front-end modules enables partitioning of the system and placing calibration points or parameters in the southbound/transmit path (towards antenna) direction. The front-end modules can be calibrated in a test environment in the factory with a calibration procedure used with the base module 100. Calibration, referred to herein, involves adjusting for gain and phase for purposes of beamforming as well as regulatory compliance, including calibration of gain, noise figure, phase offset, in-phase/quadrature imbalance as a function of frequency, gain stage, temperature and antenna. Calibration may also involve information about radio spurs or DC offset.

The memory 124 of the host 120 may be read only memory (ROM), random access memory (RAM), magnetic disk storage media devices, optical storage media devices, flash memory devices, electrical, optical, or other physical/tangible memory storage devices. Thus, in general, the memory 124 may comprise one or more tangible (non-transitory) computer readable storage media (e.g., a memory device) encoded with software comprising computer executable instructions and when the software is executed (by the processor 122) it is operable to perform the operations described herein.

The memory 206 in each front-end module stores information so that when any front-end module is plugged in to a base module 100, the base module 100 reads the information from the memory 206 so that the base module 100 can determine the various configuration information for that particular front-end module, such as the frequency band that it covers, the antenna path calibration it covers, the number of antenna elements and type of antenna elements, what function is performed by which control signal, etc., so that the base module 100 can determine what it can do with the front-end module. The base module 100 may interrogate the memory 206 via an interface, such as the Serial Peripheral Interface (SPI), to discover the information from the front-end module it in order to operate with it. However, it is envisioned that some front-end modules may have a processor or controller of some type to coordinate operations with the microprocessor 122 of the base module 100. Moreover, the memory 206 may itself store swept calibration parameters for the front-end module, and this data may be read by the microprocessor 122 of the base module 100.

More specifically, the microprocessor 122 of the base module 100 is configured to communicate via the base module connector 140 with a particular front-end module (any given one of the plurality of front-end modules) that is connected to the base module connector 140. Upon initial connection of the particular front-end module to the base module connector 140, the microprocessor 122 is configured to read the information from the memory 206 of the particular front-end module to determine the radio service that the particular front-end module is configured to operate and to supply control signals to control at least one of: one or more transmit amplifiers in the front-end module, one or more receive amplifiers in the front-end module, and one or more biases for the transmit amplifiers and/or receive amplifiers. This is described in more detail below.

In one embodiment, the microprocessor 122 may read from the memory 206 of a connected/mated front-end module, data from a header in a fix/defined format (whereas other fields in the header may have a format that depends on the specific front-end module), which data specifies details of the capability of the connected front-end module, again, such as number of antennas, frequency bands supported, antenna path calibration, regulatory limitations, dB of gain of antenna elements. Using an interface, such as the SPI with a different chip select, the microprocessor 122 can send control signals to the front-end module to control TX/RX switches, RX amplifiers, TX amplifiers and filters. The database 126 stores information about all the different types of front-end modules and the different configurations/controls for each front-end module. In addition, the database 126 may also store information indicating what each SPI pin or general-purpose input/output (GPIO) pin (one of the pins the block of control pins 144) is to be used for, for each front-end module, in other words, what each of the control pins is used to control or configure on the connected front-end module.

Figure 2B:
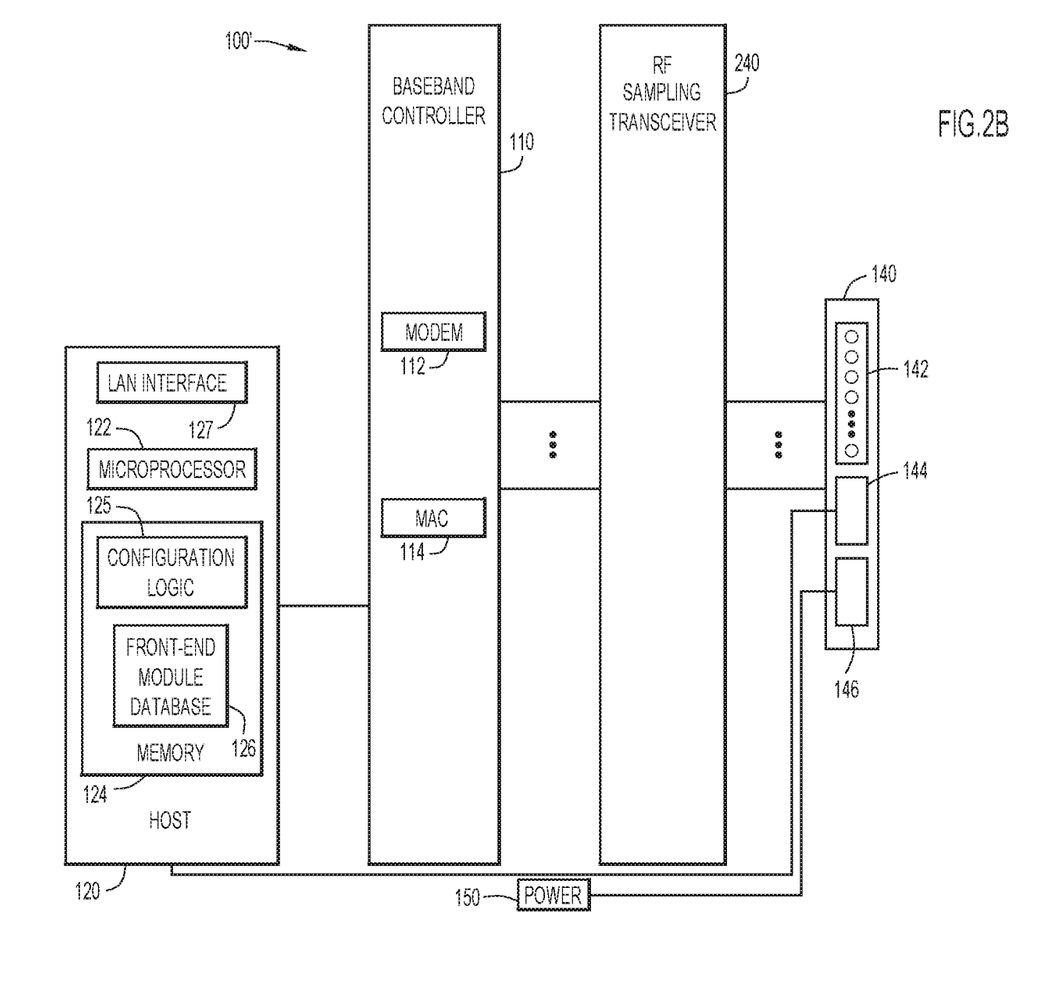
FIG. 2B is a detailed block diagram of the base module according to another example embodiment.

Reference is now made to FIG. 2B. FIG. 2B shows a variation of the base module, shown at reference numeral 100', in which instead of blocks of ADCs and DACs and RF transceivers, a single RF sampling transceiver 240 is used. The RF sampling transceiver 240 is a special purpose digital signal processor that performs all of the functions of an RF transceiver, such as RF upconversion from baseband to RF for transmission and downconversion from RF to baseband, as well as digital-to-analog conversion for the RF transmit signals and analog-to-digital conversion for the baseband receive signals. The upconversion may be performed directly from baseband to RF, and likewise, the downconversion may be performed directly from RF to baseband. The RF sampling transceiver performs the upconversion and downconversion operations by mathematical computations in the digital domain. Nevertheless, the signals coupled between the RF sampling transceiver 240 and the baseband controller 110 is digital, and the signals coupled between the RF sampling transceiver 240 and the base module connector 140 are analog.

Reference is now made to FIG. 3 for a more detailed description of front-end module 200(1), as an example of one type of front-end module. In this example, front-end module 20(1) is a cellular time division duplex (TDD) front-end module configured to operate a cellular TDD radio service in the G Citizen's Band Radio Service (CBRS) 3.6 GHz frequency band. The front-end circuitry 202 of module 200(1) includes, associated with each of the antennas 220(1)-220(4), a bias/control circuit 250, an RX amplifier 252, a TX amplifier 254 and a single pole double throw (SP2T) TX/RX switch 256. The bias/control circuit 250 is connected to each of the RX amplifier 252, TX amplifier 254 and TX/RX switch 256.

In operation, when the front-end module 200(1) connects to the base module 100 (FIG. 2), the microprocessor 122 of the base module 100 reads the memory 206 and obtains from the memory 206 information indicating that the front-end module 200(1) is a cellular TDD front-end module for the 3.6 GHz band. Recognizing that as such based on information stored in database 126, the microprocessor 122 now determines that it needs to bias the RX amplifiers and TX amplifiers of the front-end module 200(1) appropriately for operation in the 3.6 GHz band, and that there is a TX/RX switch that will need to be controlled for TX and RX modes of operation. The microprocessor 122 sends control signals via control pins 144 of the base module connector 140 to control pins 214 of the front-end module connector 210 and ultimately to the bias/control circuit 250 for each of the antennas 220(1)-220(4). The bias/control circuit 250 is responsive to control signals from the microprocessor 122 of the base module 100 to apply the appropriate bias to the RX amplifier 252 and TX amplifier 254, and to control the TX/RX switch 256 to connect the RX amplifier 252 to the associated antenna (e.g., antenna 220(1)) during receive mode or the TX amplifier 254 to the associated antenna (e.g., antenna 220(1)) during transmit mode.

Reference is now made to FIG. 4. FIG. 4 shows an example of a cellular frequency division duplex (FDD) front-end module 200(2). Moreover, the front-end module 200(2) has the capability to serve the low band (LB), middle band (MB) and high band (HB) for a cellular FDD service. The front-end module 200(2) includes an HB Power Amplifier (PA) unit 260, an MB PA unit 262, and an LB PA unit 264. Each of the HB PA unit 260, MB PA unit 262 and LB PA unit 264 includes PAs 270, bandpass filters (BPFs) 272, low noise amplifiers (LNAs) 274, a diplexer 275 and a control circuit 276. These elements are not all identical across the PA units 260, 262 and 264. For example, the BPFs 272 in the HB PA unit 260 will need to be configured to pass the frequency bandwidth for the HB in the respective transmit (downlink) and receive (uplink) signal paths (since the front-end module is FDD); thus, there is a BPF for the transmit path and a BPF for the receive path. The same applies to the MB PA unit 262 and the LB PA unit 264. There is a diplexer 275 in each of the PA units 260, 262 and 264 to split out and apply individual BPFs to the receive (uplink) transmit (downlink) signals. The control circuits 276 in the PA units 260, 262 and 264 control the bias of the PAs 270 and the LNAs 274, and also control the passbands for the BPFs in each of the PA units 260, 262 and 264.

The module 200(2) further includes a single pole three-throw (SP3T) TX/RX switch 280 that selectively connects select instances of the PA units 260, 262 and 264 to the antennas 220(1). There may also power management units (PMUs) 282 for the PA units 260, 262 and 264.

In operation, when the front-end module 200(2) connects to the base module 100 or module 100' (FIG. 2A or 2B), the microprocessor 122 of the base module reads the memory 206 and obtains from the memory 206 information indicating that the front-end module 200(2) is a cellular FDD front-end module that is to service a particular one of the HB, MB and LB frequencies. Recognizing that as such based on information stored in database 126, the microprocessor 122 now determines that it needs to send control signals to the appropriate one of the PA units 260, 262 and 264 to control biasing of amplifiers and configuration of passbands of the BPFs 272 for the appropriate one of the HB, MB and LB for a cellular FDD service. By reading the contents of the memory 206, the microprocessor 122 also determines that there is a TX/RX switch 280 that needs to be controlled for TX and RX modes of operation. The microprocessor 122 sends control signals via control pins 214 of the connector 210 to the control circuit 276 in each the appropriate one of the PA units 260, 262 and 264. The control circuits 276 are responsive to control signals from the microprocessor 122 of the base module 100 to apply the appropriate bias to the PA 270 and to the LNA 274, as well as to configure the pass bands of the BPFs 272 in the appropriate one of the PA units 260, 262 and 264, and to control the TX/RX switch 280 based on whether being in transmit mode or receive mode.

FIG. 5 illustrates an example of a front-end module 200(4) configured for servicing the unlicensed 5 and 6 GHz bands. The front-end module 200(4) is similar to the front-end module 200(1) shown in FIG. 3. The front-end module 200(4) includes, for each antenna path associated with antennas 220(1), 220(2), 220(3) and 220(4), a bias/control circuit 290, an RX amplifier 292, a TX amplifier 294 and a TX/RX switch 296. The configuration and operation of the front-end module 200(4) is very similar to that described above for front-end module 200(1) in connection with FIG. 3.

Figure 6:
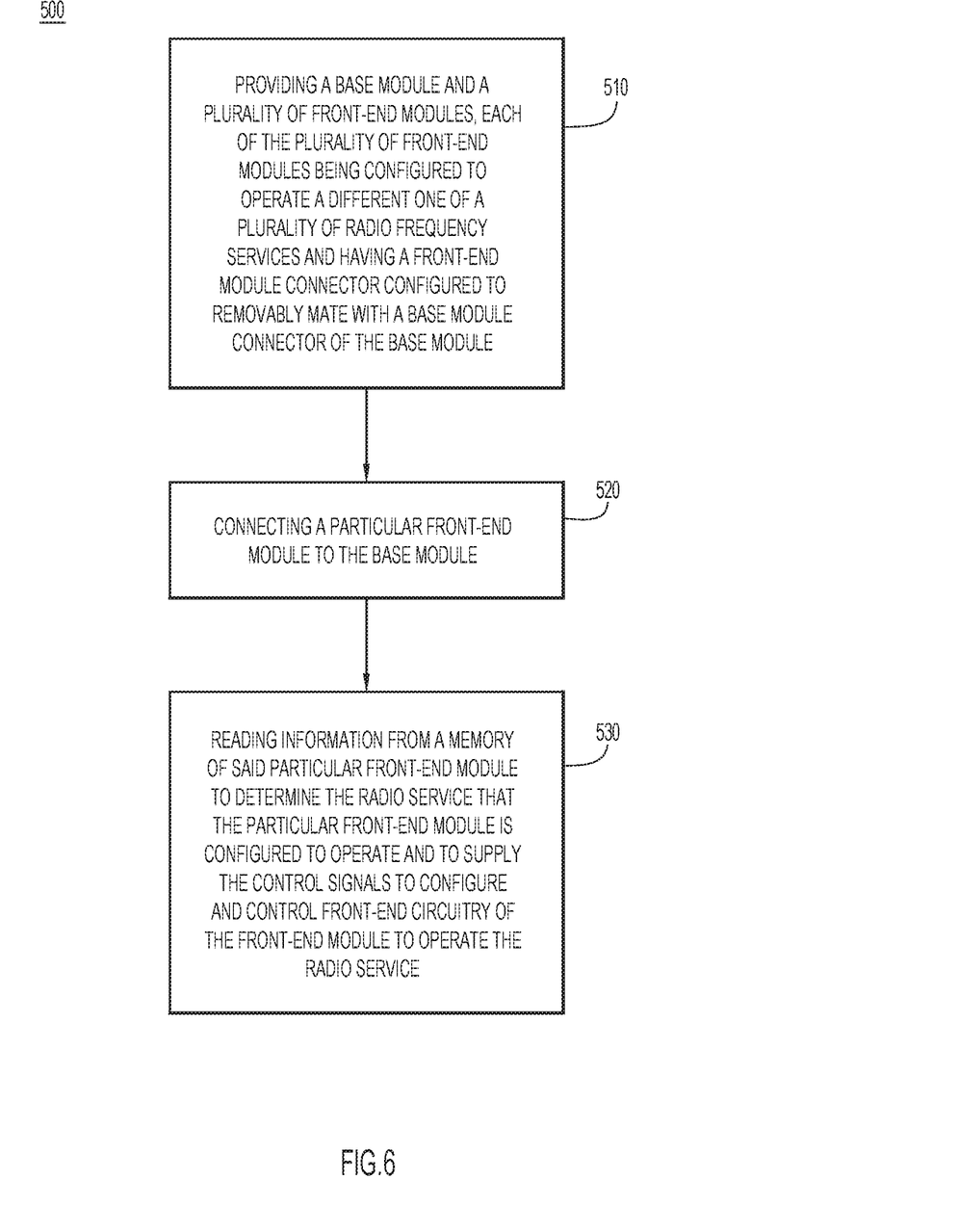
FIG. 6 is a flow chart of a method of configuring a wireless communication device, according to an example embodiment.

Turning now to FIG. 6, a flow chart is shown depicting a method 500 for configuring a wireless communication device using the techniques and embodiments described herein. At 510, a base module and a plurality of front-end modules are provided, each of the plurality of front-end modules being configured to operate a different one of a plurality of radio frequency services and having a front-end module connector configured to removeably mate with a base module connector of the base module. At 520, a particular front-end module is connected to the base module. At 530, upon connection of the particular front-end module to the base module connector, the base module reads information from a memory of the particular front-end module to determine the radio service that the particular front-end module is configured to operate and to supply control signals to configure and control front-end circuitry of the front-end module to operate the radio service.

In summary, the modular communication device depicted in the embodiments of FIGS. 1-7 have many advantages. The front-end "personality" enable various and distinct high performance radio functions from a single base platform. The cable tethered front-end module 200(3) shown in FIG. 2 eliminates cable loss effects normally plaguing remote/cabled antennas, by optimizing TX power efficiency and RX noise figure resulting from locating the power amplifiers and low noise amplifiers in proximity to the antenna(s).

The front-end modules adapted for unlicensed band deployment satisfy regulatory domain requirements for maximized Equivalent Isotropically Radiated Power (EIRP) while eliminating user selection of unlawful configurations of RF power and antenna gain. Again, using the approach of multiple front-end modules, the SKU expenses (manufacturing, distribution, customer stocking/deployment) of the base module is reduced. Moreover, a given base module can be changed/upgraded in the field with a different front-end module. This modular paradigm shifts the cost of accommodation of specialty modes of operation to the front-end module without burdening the base module product. This is particularly useful for 4G/5G small cell applications.

The modularized approach presented herein is a unique modularization of RF front-end components with antenna systems to define RF characteristics (MIMO order, RF output power, etc.) while optimizing performance for disparate (and sometimes challenging) use cases like CBRS, small cell 4G/5G, low-power wide area network (LP-WAN), etc. The embodiments presented herein are particularly important for incorporation in multiprotocol APs (e.g., Wi-Fi+5G) to economically address different frequencies, RF modes, etc.

In one form, an apparatus is provided that includes: a base module and a plurality of front-end modules. Each of the plurality of front-end modules is configured to operate a different one of a plurality of radio services. Each front-end module includes: one or more antennas; front-end circuitry; a memory configured to store information indicating which one of the plurality of radio frequency services the front-end module is configured to operate; and a front-end module connector coupled to the front-end circuitry and to the memory. The base module includes: a modem configured to perform baseband modulation of transmit data to generate baseband modulated transmit data and baseband demodulation of received baseband modulated data to recover receive data; one or more radio transceivers coupled to the modem and configured to upconvert the baseband modulated transmit data to produce radio frequency (RF) transmit signals for transmission and to downconvert RF received signals to obtain the received baseband modulated data, the one or more radio transceivers having a universal frequency band coverage spanning frequency bands of operation of the plurality of front-end modules; a base module connector configured to mate with the front-end module connector of any one of the plurality of front-end modules, the connector configured to supply the RF transmit signals to, and to receive the RF received signals from, a particular front-end module of the plurality of front-end modules that is connected to the base module connector, the base module connector further configured to supply power and control signals from the base module to said particular front-end module; a processor configured to communicate via the base module connector with said particular front-end module that is connected to the base module connector, wherein upon connection of said particular front-end module to the base module connector, the processor is configured to read the information from the memory of said particular front-end module to determine the radio service that the particular front-end module is configured to operate and to supply the control signals to configure and control the front-end circuitry to operate the radio service.

In one form, the front-end circuitry includes one or more receive amplifiers, one or more transmit amplifiers and one or more bias control circuits that set the bias, and control operation, of the one or more receive amplifiers and the one or more transmit amplifiers, wherein the control signals supplied by the base module are coupled to the one or more bias control circuits. The front-end circuitry of the particular front-end module further includes one or more transmit/receive switches configured to connect the one or more transmit amplifiers to the one or more antennas during a transmit mode and to connect the one or more receive amplifiers to the one or more antennas during a receive mode, and wherein the processor of the base module is configured to supply transmit/receive control signals via the base module connector to said particular front-end module to control the one or more transmit/receive switches. The front-end circuitry of the particular front-end module further may include one or more bandpass filters, and wherein the processor of the base module is configured to supply filter control signals via the base module connector to said particular front-end module to control the one or more bandpass filters to pass a particular frequency band. In one form, respective ones of the plurality of front-end modules are configured to operate a radio service in a respective different radio frequency band. In one form, one of the plurality of front-end modules may include a cable tether connected between the front-end module connector and a housing that contains the front-end circuitry, and wherein the one or more antennas are external antennas attached the housing or conformal antennas internal to or on the exterior of the housing so that the one or more antennas are remote from the base module when the front-end module connector is connected to the base module connector.

The processor of the base module may be configured to determine, from the information read from the memory of the particular front-end module one or more of: number of antennas, frequency band(s) of operation for the radio service, antenna path calibration, regulatory limitations if any, gain of antennas if any.

In one form, the one or more radio transceivers are implemented on one or more integrated circuit. In another form, the functions of the one or more radio transceivers are implemented by a RF sampling transceiver digital signal processor that performs RF upconversion from baseband to RF to produce the RF transmit signals and downconversion from RF to baseband to produce the received baseband modulated data, and digital-to-analog conversion for the RF transmit signals and analog-to-digital conversion for the received baseband modulated data.

A method is also provided for configuring a communication device. The method includes providing a base module and a plurality of front-end modules, each of the plurality of front-end modules being configured to operate a different one of a plurality of radio services and having a front-end module connector configured to removeably mate with a base module connector of the base module; connecting a particular front-end module to the base module; and upon connection of the particular front-end module to the base module connector, the base module reading information from a memory of the particular front-end module to determine the radio service that the particular front-end module is configured to operate and to supply control signals to configure and control front-end circuitry of the front-end module to operate the radio service.

Still further, a radio frequency front-end module apparatus is provided. The apparatus includes front-end circuitry; a memory configured to store information indicating which one of a plurality of radio services the front-end circuitry is configured to operate; and a connector coupled to the front-end circuitry and to the memory. The front-end circuitry is responsive to, and controlled by control signals received from a base module that removeably connects to the connector, the control signals being generated by the base module based on the information read by the base module from the memory when the base module is connected to the connector.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
   a base module and a plurality of front-end modules;
   each of the plurality of front-end modules being configured to operate a different one of a plurality of radio frequency services, each front-end module including:
      one or more antennas;
      front-end circuitry;
      a memory configured to store information indicating which one of the plurality of radio frequency services the front-end module is configured to operate; and
      a front-end module connector coupled to the front-end circuitry and to the memory;
   the base module including:
      a modem configured to perform baseband modulation of transmit data to generate baseband modulated transmit data and baseband demodulation of received baseband modulated data to recover receive data;
      one or more radio transceivers coupled to the modem and configured to upconvert the baseband modulated transmit data to produce radio frequency (RF) transmit signals for transmission and to downconvert RF received signals to obtain the received baseband modulated data, the one or more radio transceivers having a universal frequency band coverage spanning frequency bands of operation of the plurality of front-end modules;
      a base module connector configured to mate with the front-end module connector of any one of the plurality of front-end modules, the base module connector configured to supply the RF transmit signals to, and to receive the RF received signals from, a particular front-end module of the plurality of front-end modules that is connected to the base module connector, the base module connector further configured to supply power and control signals from the base module to said particular front-end module; and
      a processor configured to communicate via the base module connector with said particular front-end module that is connected to the base module connector, wherein upon connection of said particular front-end module to the base module connector, the processor is configured to read the information from the memory of said particular front-end module to determine a radio service that the particular front-end module is configured to operate and to supply the control signals to configure and control the front-end circuitry to operate the radio service.

2. The apparatus of claim 1, wherein the front-end circuitry includes one or more receive amplifiers, one or more transmit amplifiers and one or more bias control circuits that set bias, and control operation, of the one or more receive amplifiers and the one or more transmit amplifiers, wherein the control signals supplied by the base module are coupled to the one or more bias control circuits.

3. The apparatus of claim 2, wherein the front-end circuitry of said particular front-end module further includes one or more transmit/receive switches configured to connect the one or more transmit amplifiers to the one or more antennas during a transmit mode and to connect the one or more receive amplifiers to the one or more antennas during a receive mode, and wherein the processor of the base module is configured to supply transmit/receive control signals via the base module connector to said particular front-end module to control the one or more transmit/receive switches.

4. The apparatus of claim 1, wherein the processor of the base module is configured to determine, from the information read from the memory of the particular front-end module, one or more of: number of antennas, frequency band(s) of operation for the radio service, antenna path calibration, regulatory limitations if any, gain of antennas if any.

5. The apparatus of claim 1, wherein the front-end circuitry of said particular front-end module further includes one or more bandpass filters, and wherein the processor of the base module is configured to supply filter control signals via the base module connector to said particular front-end module to control the one or more bandpass filters to pass a particular frequency band.

6. The apparatus of claim 5, wherein respective ones of the plurality of front-end modules are configured to operate a radio service in a respective different radio frequency band.

7. The apparatus of claim 1, wherein one of the plurality of front-end modules comprises a cable tether connected between the front-end module connector and a housing that contains the front-end circuitry, and wherein the one or more antennas are external antennas attached the housing or conformal antennas internal to or on an exterior of the housing so that the one or more antennas are remote from the base module when the front-end module connector is connected to the base module connector.

8. The apparatus of claim 1, wherein the one or more radio transceivers are implemented on one or more integrated circuits.

9. The apparatus of claim 1, wherein the functions of the one or more radio transceivers are implemented by a RF sampling transceiver digital signal processor that performs RF upconversion from baseband to RF to produce the RF transmit signals and downconversion from RF to baseband to produce the received baseband modulated data, and digital-to-analog conversion for the RF transmit signals and analog-to-digital conversion for the received baseband modulated data.

10. A method for configuring a communication device, the method comprising:

providing a base module and a plurality of front-end modules, each of the plurality of front-end modules being configured to operate a different one of a plurality of radio services and having a front-end module connector configured to removeably mate with a base module connector of the base module;

connecting a particular front-end module to the base module; and upon connection of said particular front-end module to the base module connector, the base module reading information from a memory of said particular front-end module to determine a radio service that the particular front-end module is configured to operate and to supply control signals to configure and control front-end circuitry of the particular front-end module to operate the radio service.

11. The method of claim 10, wherein the control signals supplied by the base module are coupled to one or more bias control circuits of the particular front-end module to set bias of and control an operation of one or more receive amplifiers and one or more transmit amplifiers of the particular front-end module.

12. The method of claim 11, wherein the control signals include transmit/receive control signals supplied to one or more transmit/receive switches to connect the one or more transmit amplifiers to one or more antennas during transmit mode and to connect the one or more receive amplifiers to the one or more antennas during receive mode.

13. The method of claim 10, further comprising the base module determining, from the information read from the memory of the particular front-end module, one or more of: number of antennas, frequency band(s) of operation for a radio service from among the plurality of radio services, antenna path calibration, regulatory limitations if any, gain of antennas if any.

14. The method claim 10, further comprising the base module controlling operation of a modem and one or more radio transceivers of the base module according to a radio service from among the plurality of radio services determined for said particular front-end module.

15. The method of claim 10, further comprising the base module operating one or more radio transceivers that have a universal frequency band coverage spanning frequency bands of the plurality of front-end modules.

16. An apparatus comprising:
front-end circuitry;
a memory configured to store information indicating which one of a plurality of radio services the front-end circuitry is configured to operate; and
a connector coupled to the front-end circuitry and to the memory,
wherein the front-end circuitry is responsive to, and controlled by control signals received from a base module that removeably connects to the connector, the control signals being generated by the base module based on the information read by the base module from the memory when the base module is connected to the connector,
wherein the front-end circuitry includes one or more receive amplifiers, one or more transmit amplifiers and one or more bias control circuits that set bias of and control an operation of the one or more receive amplifiers and the one or more transmit amplifiers, and
wherein the control signals supplied by the base module are coupled to the one or more bias control circuits.

17. The apparatus of claim 16, wherein the front-end circuitry further includes one or more transmit/receive switches configured to connect the one or more transmit amplifiers to one or more antennas during a transmit mode and to connect the one or more receive amplifiers to the one or more antennas during a receive mode, and wherein the control signals include transmit/receive control signals to control the one or more transmit/receive switches.

18. The apparatus of claim 17, wherein the front-end circuitry further includes one or more filters, and wherein the control signals control the one or more filters, and wherein the one or more filters are bandpass filters that are configurable to pass a particular frequency band.

19. An apparatus comprising:
front-end circuitry;
a memory configured to store information indicating which one of a plurality of radio services the front-end circuitry is configured to operate; and
a connector coupled to the front-end circuitry and to the memory,
wherein the front-end circuitry is responsive to, and controlled by control signals received from a base module that removeably connects to the connector, the control signals being generated by the base module based on the information read by the base module from the memory when the base module is connected to the connector, and
wherein the front-end circuitry is configured to operate in conjunction with one or more radio transceivers in the base module that have a universal frequency band coverage spanning frequency bands in which the plurality of radio services operate.

20. The apparatus of claim 19, wherein the connector is a mating connector that removeably mates with the base module.

* * * * *